July 23, 1940.  W. LE R. DAGGETT  2,208,880
GRASS CUTTER AND RAKE
Filed Feb. 28, 1939
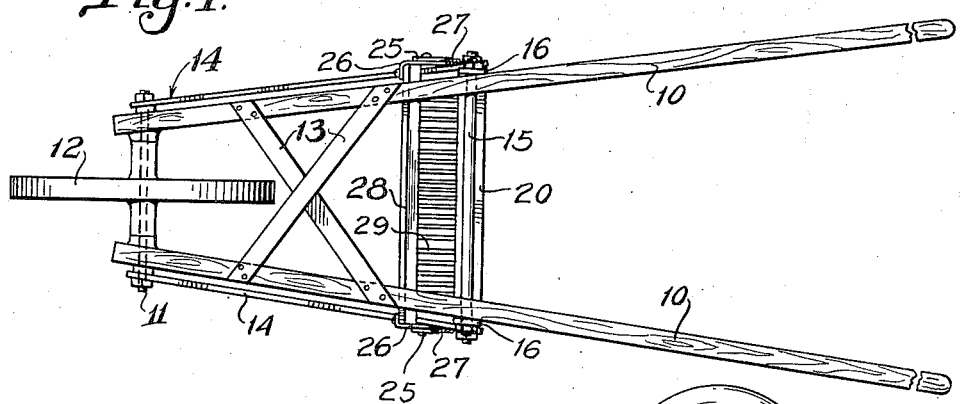
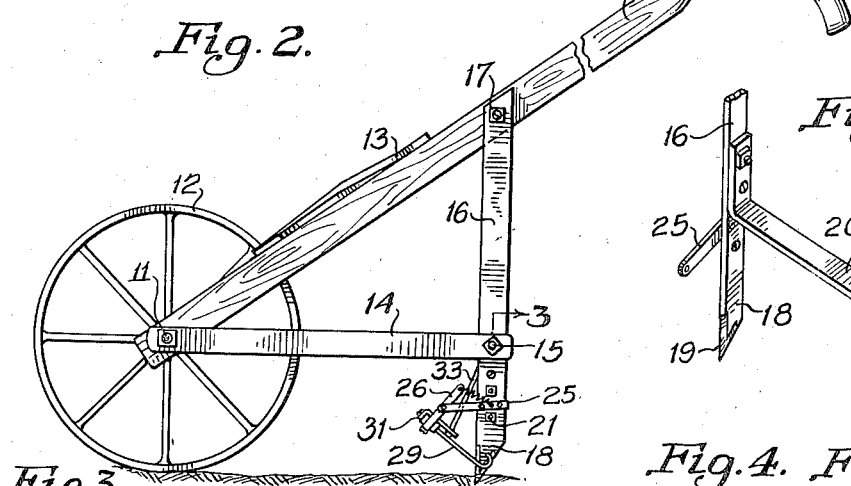
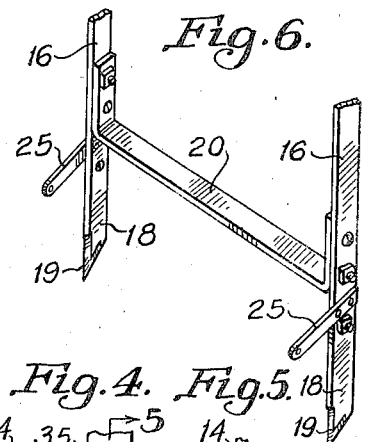
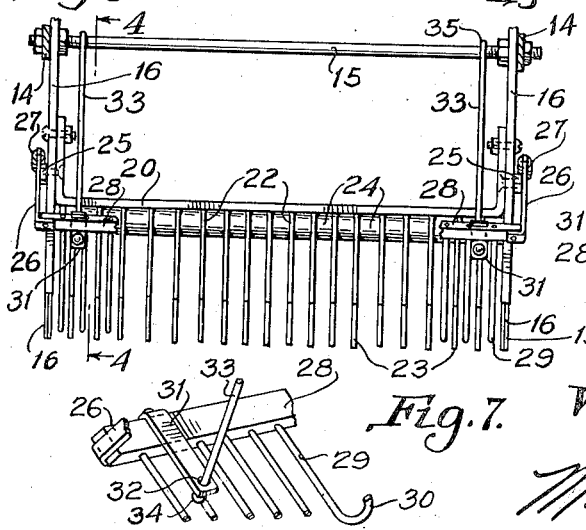
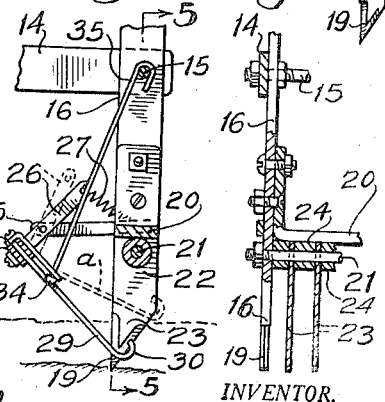
INVENTOR.
WARREN L. DAGGETT
BY
ATTORNEY.

Patented July 23, 1940

2,208,880

UNITED STATES PATENT OFFICE 2,208,880

GRASS CUTTER AND RAKE

Warren Le Roy Daggett, Los Angeles, Calif.

Application February 28, 1939, Serial No. 258,965

4 Claims. (Cl. 97—59)

My invention relates generally to lawn and garden implements and, more particularly to a manually operable implement that is especially designed for the elimination, by cutting and raking, of undesirable growths such as Bermuda grass and the like.

The principal objects of my invention are, to provide an implement of the character referred to, that may be conveniently moved by hand forward or backward over lawns and the surfaces of gardens and the like, for the purpose of cutting the roots, rhizomes and surface runners of undesirable ground surface growths, further, to provide an implement having a series of combined cutting blades and raking teeth and, to provide simple means for automatically and effectively cleaning all accumulations from said blades or teeth and further, to provide an implement wherein the frame is supported at its forward end by a single wheel, thus enabling the implement to be tilted laterally in either direction to conform with the surface contour of the lawn or ground upon which the implement is being used.

A further object of my invention is, to provide a grass cutting and raking implement of the character referred to, wherein the combined blade and teeth cleaning means is arranged to act automatically as the implement is moved forwardly or backwardly over the lawn and, said blade and teeth cleaning means also capable of being manually actuated to effect the removal of accumulations from between the blades and teeth.

With the foregoing and other objects in view, my invention consists in certain novel features of construction and arrangement of parts that will be hereinafter more fully described and claimed and illustrated in the accompanying drawing in which:

Fig. 1 is a top plan view of a grass cutter and rake constructed in accordance with my invention.

Fig. 2 is a side elevational view of the implement with parts broken away and in section.

Fig. 3 is an enlarged transverse section taken on the line 3—3 of Fig. 2.

Fig. 4 is a vertical cross section taken on the line 4—4 of Fig. 3.

Fig. 5 is a vertical section taken on the line 5—5 of Fig. 4.

Fig. 6 is a perspective view of the frame that carries the combined cutting blades and rake teeth.

Fig. 7 is a detail perspective view of the end portion of the blade and teeth cleaning member.

Referring by numerals to the accompanying drawing which illustrates a preferred embodiment of my invention, 10—10 designate handles similar to those used on hand cultivators and plows, the forward ends of said handles carrying a transversely disposed axle 11 on which is mounted for rotation a wheel 12. Crossed braces 13 are arranged between the forward portions of the handles 10 to give the frame of the implement strength and stability.

Mounted on the axle 11 are the forward ends of horizontally disposed bars 14, the rear ends of which are secured to the ends of a transverse rod 15, the end portions of the latter passing through and being secured to vertically disposed bars 16, the upper ends of which are suitably secured by bolts 17 or otherwise to the intermediate portions of the handles 10.

The lower portions of the vertically disposed bars 16 extend a short distance below the transverse rod 15 and the lower ends of these bars are cut off at an angle, so as to form substantially V-shaped lower end portions 18 and, both edges of these portions 18 are sharpened as designated by 19.

Arranged between the lower portions of the vertical bars 16 a short distance above the pointed sharpened lower ends thereof, is a transverse rail 20, the ends of which are suitably secured to the upright bars 16 and, arranged between said upright bars 16 just below the transverse bar 20 is a rod 21, the ends of which are suitably secured to the bars 16.

Mounted on rod 21 is a series of depending members 22 of metal, which function as combined cutting blades and rake teeth, the lower portions of these members being cut off at an angle to form substantially V-shaped lower end portions 23, both edges of which are sharpened, thus conforming with the shape of the lower end portions 19 of the bars 16. The upper ends of the combined cutters and teeth 22 abut the under face of cross bar 20 and, to maintain these cutters and teeth in proper spaced relation, spacing collars 24 are arranged on rod 21 between the upper portions of said cutters and teeth.

Secured to the upright members 16 adjacent the ends of cross bar 20, are short forwardly projecting arms 25 and, pivotally mounted on the forward ends of these arms are short arms 26 which normally occupy inclined positions, as illustrated in Figs. 2 and 4. Secured to the upper ends of these pivoted arms 26 are, the upper forward ends of retractile springs 27, the lower rear ends of which are secured to the upright side members 16. Secured to the lower forward ends of the pivoted arms 26 are, the ends of a cross bar 28 and secured thereto are, the upper forward ends of downwardly and rearwardly projecting fingers 29, preferably formed of resilient wire, and the lower portions of these fingers are curved upwardly as designated by 30.

Under normal conditions, the springs 27 maintain the frame comprising pivoted arms 26 and cross bar 28 so that the curved lower ends of the fingers 29 are positioned between the pointed lower ends of the upright side bars 16 and the combined blades and teeth, as illustrated in Figs. 2 and 4, and, when the pointed lower ends of the cutters and teeth enter the ground, the resilient fingers 29 flex upwardly as illustrated by dotted lines as in Fig. 4, with the upwardly curved lower ends 30 riding on the surface of the lawn or ground.

Secured to cross bar 28 adjacent its ends and projecting downwardly and rearwardly therefrom are short arms 31 and, formed in the lower rear end of each arm is an aperture 32. Arranged for sliding movement through each aperture 32 is, the lower portion of an upwardly projecting rod 33 provided on its lower end below the arm 31 with a head 34 and, the upper end of each of these rods 33 is bent to form a hook 35 that normally engages over cross rod 15.

In the use of my improved grass cutter and rake, the same is manually moved a short distance forward and then a short distance rearwardly over the lawn from which the Bermuda grass or other undesirable growth is to be removed and, during each movement sufficient downward pressure is imparted to the handles to cause the sharpened lower portions of the upright bars 18 and the combined cutters and teeth 22 to pass downward through the grass, with the result that the sharp edges on the teeth cut the roots, rhizomes, and surface runners, of the undesirable ground surface growths, thereby to a large extent killing such growths.

As the implement is thus moved forward and backward over the lawn, a large portion of the cut roots, rhizomes, and surface runners, will be raked to the surface of the ground by the action of the members 23 above the sharp pointed lower ends thereof and, such cuttings will accumulate between the upper portions of the members 22. Such accumulations necessarily force the lower portions of the resilient fingers 29 upwardly between the combined blades and rake teeth and, such action causes the arms 26 to swing on their axes, thereby expanding and storing power in the retractile springs 27.

When the rear portion of the implement is lifted so as to withdraw the lower portions of the members 22 from the surface of the lawn, the springs 27 will act to restore the fingers 29 to their original positions and, in moving downwardly between the members 22 said fingers will remove all cuttings and accumulations from between the combined blades and cutters, such action being automatic.

In the event that the fingers 29 fail to dislodge and remove all accumulations from between the fingers, the operator of the implement may engage the upper portions of the rods 35 and, after disengaging the hooks on the upper ends of said rods from cross rod 15, the frame comprising the arms 26 and cross bar 28 may be swung on the axis between the arms 26 and the arms 25 several times, thus effectively dislodging and removing the accumulations from the combined cutting and raking members.

An especially desirable feature of my invention is, the mounting of the frame of the implement upon a single wheel, for such construction enables the implements to be conveniently moved over the surface of a lawn and tilted in either direction to conform with the surface contour of the lawn and, particularly along the edges thereof and also along the edges of flower beds.

Thus it will be seen that I have provided a grass cutter and rake that is relatively simple in construction, inexpensive of manufacturer, and very effective in performing the functions for which it is intended.

It will be understood that minor changes in the size, form and construction of the various parts of my improved grass cutter and rake, may be made and substituted for those herein shown and described, without departing from the spirit of my invention, the scope of which is set forth in the appended claims.

I claim as my invention:

1. A grass cutter and rake comprising a pair of handles, a wheel arranged for operation between the forward ends of said handles, a pair of upright members depending from the intermediate portions of said handles, the lower ends of which upright members are pointed and sharpened, a cross bar arranged between the lower portions of said upright members, a series of combined cutters and rake teeth fixedly mounted between the lower portions of said upright members below said cross bar, said combined cutters and rake teeth having lower ends which are pointed and sharpened, a frame mounted for swinging movement on said upright members in front of said combined cutters and rake teeth and a series of fingers extending from said frame downwardly and rearwardly between the pointed sharpened lower ends of said cutters and rake teeth.

2. A grass cutter and rake comprising a pair of handles, a wheel arranged for operation between the forward ends of said handles, a pair of upright members depending from the intermediate portions of said handles, the lower ends of which upright members are pointed and sharpened, a cross bar arranged between the lower portions of said upright members, a series of combined cutters and rake teeth fixedly mounted between the lower portions of said upright members below said cross bar, said combined cutters and rake teeth having lower ends which are pointed and sharpened, a frame mounted for swinging movement on said upright members in front of said combined cutters and rake teeth, a series of fingers extending from said frame downwardly and rearwardly between the pointed sharpened lower ends of said cutters and rake teeth and springs connected to said frame for yieldingly resisting its swinging movement in one direction.

3. A grass cutter and rake comprising a pair of handles, a wheel arranged for operation between the forward ends of said handles, a pair of upright members depending from the intermediate portions of said handles, the lower ends of which upright members are pointed and sharpened, a cross bar arranged between the lower portions of said upright members, a series of combined cutters and rake teeth fixedly mounted between the lower portions of said upright members below said cross bar, said combined cutters and rake teeth having lower ends which are pointed and sharpened, a frame mounted for swinging movement on said upright members in front of said combined cutters and rake teeth, a series of fingers extending from said frame downwardly and rearwardly between the pointed sharpened lower ends of said cutters and rake teeth and the lower rear ends of which fingers are curved upwardly.

4. A grass cutter and rake comprising a pair of handles, a wheel arranged for operation between the forward ends of said handles, a pair of upright members depending from the intermediate portions of said handles, the lower ends of which upright members are pointed and sharpened, a cross bar arranged between the lower portions of said upright members, a series of combined cutters and rake teeth fixedly mounted between the lower portions of said upright members below said cross bar, said combined cutters and rake teeth having lower ends which are pointed and sharpened, a frame mounted for swinging movement on said upright members in front of said combined cutters and rake teeth, a series of fingers extending from said frame downwardly and rearwardly between the pointed sharpened lower ends of said cutters and rake teeth and manually operable means for actuating said swinging frame.

WARREN LE ROY DAGGETT.